US011256120B2

(12) United States Patent
Cheng et al.

(10) Patent No.: US 11,256,120 B2
(45) Date of Patent: Feb. 22, 2022

(54) DISPLAY PANEL MANUFACTURING METHOD COMPRISING A STEP OF FORMING A PHOTORESIST LAYER THAT ENCIRCLES AN EDGE OF A SUBSTRATE TO FORM A GROOVE

(71) Applicant: Wuhan China Star Optoelectronics Technology Co., Ltd., Wuhan (CN)

(72) Inventors: Wei Cheng, Wuhan (CN); Kotaro Yoneda, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 176 days.

(21) Appl. No.: 16/625,853

(22) PCT Filed: Aug. 6, 2019

(86) PCT No.: PCT/CN2019/099490
§ 371 (c)(1),
(2) Date: Dec. 23, 2019

(87) PCT Pub. No.: WO2021/012316
PCT Pub. Date: Jan. 28, 2021

(65) Prior Publication Data
US 2021/0294153 A1 Sep. 23, 2021

(30) Foreign Application Priority Data
Jul. 19, 2019 (CN) .......................... 201910654922.7

(51) Int. Cl.
*G02F 1/1333* (2006.01)
*G02F 1/1335* (2006.01)
*G02F 1/13363* (2006.01)

(52) U.S. Cl.
CPC .... *G02F 1/133317* (2021.01); *G02F 1/13363* (2013.01); *G02F 1/133305* (2013.01); *G02F 1/133528* (2013.01); *G02F 1/133302* (2021.01); *G02F 1/133565* (2021.01)

(58) Field of Classification Search
CPC ......... G02F 1/133565; G02F 1/133302; G02F 1/13332
See application file for complete search history.

(56) References Cited

U.S. PATENT DOCUMENTS

| | | | | |
|---|---|---|---|---|
| 2006/0176417 A1* | 8/2006 | Wu | .................. | G02F 1/136277 349/58 |
| 2014/0016043 A1* | 1/2014 | Chen | ..................... | G06F 3/0412 349/12 |
| 2015/0042944 A1* | 2/2015 | Hatanaka | ............... | G02B 5/305 349/194 |
| 2015/0338689 A1* | 11/2015 | Min | ........................ | C09K 19/56 349/88 |

(Continued)

*Primary Examiner* — Paul C Lee

(57) ABSTRACT

The present invention provides a method of manufacturing a display panel and a display panel manufactured using the same. The display panel includes: a substrate, a photoresist layer, a flexible substrate layer, a lower polarizer, a retardation film, a liquid crystal layer, and an upper polarizer, which are laminated disposed. The method includes steps of: providing a substrate; forming a flexible substrate layer on the substrate; forming a lower polarizer on the flexible substrate layer by coating; forming a liquid crystal layer on the lower polarizer; and forming an upper polarizer on the liquid crystal layer by coating.

9 Claims, 2 Drawing Sheets

(56) References Cited

U.S. PATENT DOCUMENTS

2017/0293058 A1* 10/2017 Lee ..................... G02B 5/3016
2018/0088394 A1*  3/2018 Notoshi ............ G02F 1/133528
2018/0157093 A1*  6/2018 Jang .................... H05K 9/0054

* cited by examiner

DISPLAY PANEL MANUFACTURING METHOD COMPRISING A STEP OF FORMING A PHOTORESIST LAYER THAT ENCIRCLES AN EDGE OF A SUBSTRATE TO FORM A GROOVE

RELATED APPLICATIONS

This application is a National Phase of PCT Patent Application No. PCT/CN2019/099490 having International filing date of Aug. 6, 2019, which claims the benefit of priority of Chinese Patent Application No. 201910654922.7 filed on Jul. 19, 2019. The contents of the above applications are all incorporated by reference as if fully set forth herein in their entirety.

FIELD OF INVENTION FIELD AND BACKGROUND OF THE INVENTION

The present invention relates to the field of display technology, and in particular, to a method of manufacturing a display panel and a display panel manufactured using the same.

Compared with traditional display screens, current liquid crystal display screens, mobile phone screens, tablets, etc., pursue higher definition, higher screen ratios, lower power consumption, and better display effect. In addition, in terms of flexible screens and folding screens, their new shape designs have become a goal that is pursued by more and more customers. Besides being thin and light, flexible screens and folding screens are favored for their good bendability and flexibility. Currently, in manufacturing folding screens, a folding radius of curvature cannot reach a smaller range. If the radius of curvature of the display is R5-R10, traditional processes and a polarizer (POL) material cannot achieve a folding of a smaller radius of curvature. Display failure is prone to occur due to metal wire breakage in the bent position and difference in box thickness. In addition, there is a big problem that the folding of the POL cannot be achieved. Whether folding after or before bonding POL, the problem of POL breakage and failure is prone to occur at the folded position because the material of POL is brittle cellulose triacetate (TAC). Consequently, there is a need to design a new manufacturing method of a display panel and a display panel manufactured using the same to overcome the problems in the prior art.

In view of the shortcomings and deficiencies of the prior art, the present invention provides a method for manufacturing a display panel and a display panel manufactured by using the same, which solves the problem of breakage and failure when the polarizer is folded. Consequently, the display panel having a smaller radius of curvature at the folded position is achieved.

SUMMARY OF THE INVENTION

An embodiment of the present invention provides a method of manufacturing a display panel, including the following steps:
Providing a substrate; forming a flexible substrate layer on the substrate; forming a lower polarizer on the flexible substrate layer by coating; forming a liquid crystal layer on the lower polarizer; and forming an upper polarizer on the liquid crystal layer by coating.

Further, material of the lower polarizer or the upper polarizer includes a guest-host type polymer liquid crystal.

Further, material of the lower polarizer or the upper polarizer further includes a dichroic dye.

Further, material of the substrate includes a glass, polyethylene terephthalate, or an amorphous cycloolefin polymer.

Further, after providing the substrate and before forming the flexible substrate layer, the method further includes: forming a photoresist layer on the substrate, the photoresist layer encircling an edge of the substrate to form a groove; wherein the flexible substrate layer, the lower polarizer, the liquid crystal layer, and the upper polarizer are sequentially formed in the groove.

Further, material of the photoresist layer includes a black ink or white ink.

Further, after forming the lower polarizer and before forming the liquid crystal layer, the method further includes forming a retardation film on the lower polarizer.

Further, in the step of forming the retardation film on the lower polarizer, the retardation film is formed by coating and irradiating with ultraviolet rays.

Further, in the step of forming the flexible substrate layer, the flexible substrate layer is formed by a way of applying polyimide solution and performing alignment by irradiating with ultraviolet rays.

A further embodiment of the present invention provides a display panel manufactured by the above method, including a substrate, a photoresist layer, a flexible substrate layer, a lower polarizer, a retardation film, a liquid crystal layer, and an upper polarizer. Specifically, the photoresist layer is disposed around an edge of the substrate to form a groove therein; the flexible substrate layer is disposed in the groove on the substrate; the lower polarizer is disposed on the flexible substrate layer; the retardation film is disposed on the lower polarizer; the liquid crystal layer is disposed on the retardation film; and the upper polarizer is disposed on the liquid crystal layer.

The present invention provides a method of manufacturing a display panel and a display panel manufactured using the same. The coating type polarizer design not only solves the process difficulty of the irregular shape of the polarizer but also solves the technical problem of breakage and failure of the polarizer when folded, consequently, the display panel having a smaller radius of curvature at the folded position is realized. In addition, a retardation film is provided to improve stability and service life of the polarizer. The retardation film compensates the phase difference at different wavelengths of the liquid crystal layer, thereby, improves contrast, and avoids muster watermark phenomenon in the reliability test. Moreover, because it is a coating type material, also avoids the problems of weak adhesion of glue and surface in the conventional stacked materials, poor heat dissipation capability, weak support force, bursting and the like.

DESCRIPTION OF THE SEVERAL VIEWS OF THE DRAWINGS

In order to more clearly illustrate the technical solutions in the embodiments of the present invention, the following figures described in the embodiments will be briefly introduced. It is obvious that the drawings described below are merely some embodiments of the present invention, other drawings can also be obtained by the person ordinary skilled in the field based on these drawings without doing any creative activity.

REFERENCE NUMERALS

Figure 1:
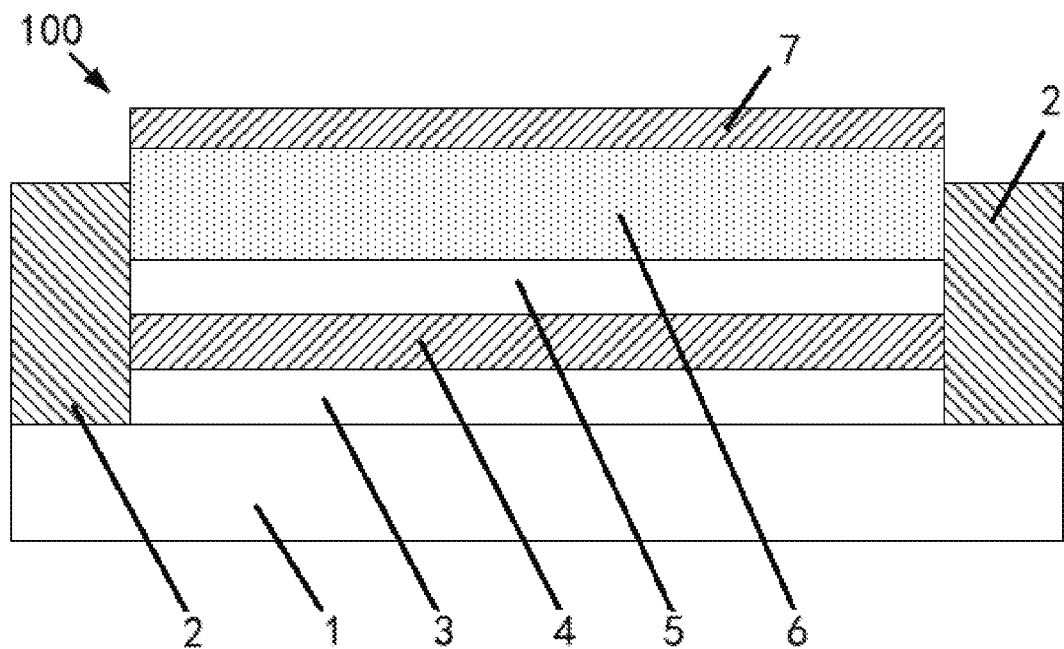
FIG. 1 is a schematic structural view of a display panel according to an embodiment of the present invention.

Substrate 1; photoresist layer 2; flexible substrate layer 3; lower polarizer 4; retardation film 5; liquid crystal layer 6; upper polarizer 7; groove 10; display panel 100.

DESCRIPTION OF SPECIFIC EMBODIMENTS OF THE INVENTION

The technical solutions in the embodiments of the present invention will be clearly and completely described in the following with reference to the accompanying drawings. It is obvious that the described embodiments are only a part of the embodiments of the invention, and not all of the embodiments. All other embodiments obtained by a person skilled in the art based on the embodiments of the present invention without creative efforts are within the scope of the present invention.

The following description of the various embodiments is provided to illustrate the specific embodiments of the invention. Directional terms mentioned in the present invention, such as "upper", "lower", "front", "behind", "left", "right", "inside", "outside", "side", etc., are merely refer to the direction of the drawings. Therefore, the directional terminology used is for the purpose of illustration and understanding of the invention. In the drawings, structurally similar elements are denoted by the same reference numerals.

In the drawings, structurally identical components are denoted by the same reference numerals, and structural or functionally similar components are denoted by like reference numerals. The dimensions and thickness of each component shown in the drawings are arbitrarily shown, and the invention does not limit the size and thickness of each component. In order to make the illustration clearer, some parts of the drawing appropriately exaggerate the thickness of the components.

Please refer to FIG. 1, an embodiment of the present invention provides a display panel 100, including a substrate 1, laminated disposed thereon, a photoresist layer 2, a flexible substrate layer 3, a lower polarizer 4, a retardation film 5, a liquid crystal layer 6, and an upper polarizer 7. Specifically, the photoresist layer 2 is disposed on the substrate 1 and encircles an edge thereof, and a groove 10 is formed inside the photoresist layer 2; the flexible substrate layer 3 is disposed in the groove 10 on the substrate 1; the lower polarizer 4 is disposed on the flexible substrate layer 3; the retardation film 5 is disposed on the lower polarizer 4; the liquid crystal layer 6 is disposed on the retardation film 5; and the upper polarizer 7 is disposed on the liquid crystal layer 6.

Figure 2:
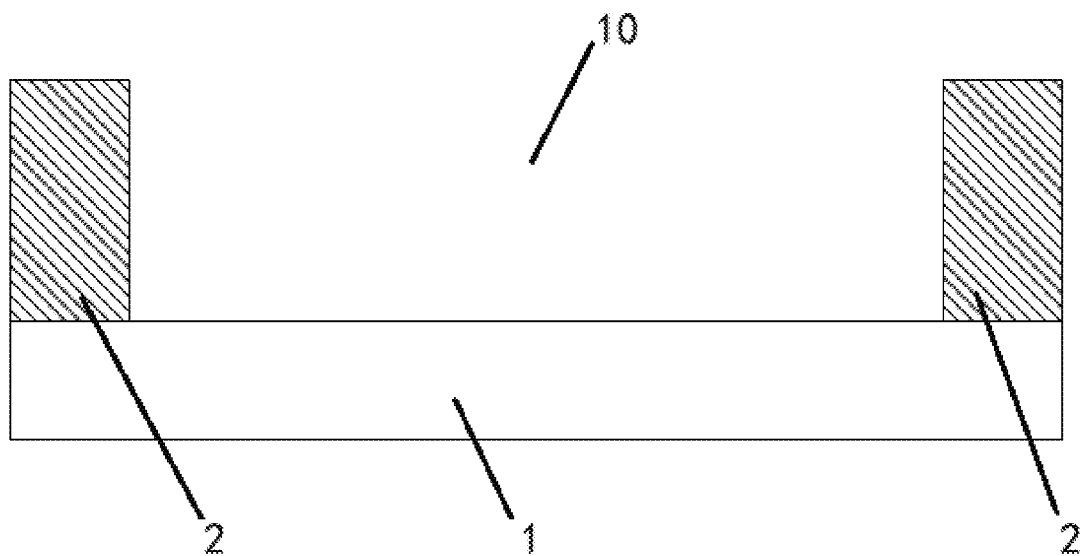
FIG. 2 is a schematic structural view of a groove in the embodiment of the present invention.

Please refer to FIG. 2, the photoresist layer 2 is disposed around to form a groove 10. Material of the photoresist layer 2 includes black ink or white ink. In other words, the color of the photoresist layer is black or white.

In this embodiment, material of the substrate 1 includes glass, polyethylene terephthalate (PET) or amorphous cycloolefin polymer (COP). COP is an optical material and is the most promising material to replace cellulose triacetate (TAC) in traditional polarizers. COP has better optical performance than TAC, and its mechanical properties and temperature resistance are superior to TAC.

In this embodiment, the main purpose for disposing of the retardation film 5 is to improve stability and service life of the polarizer. Further, the retardation film 5 compensates the phase difference under different wavelengths of the liquid crystal layer 6, thereby, the contrast is improved. In addition, the retardation film 5 can avoid muster watermark phenomenon in the reliability test. Moreover, because it is a coating type material, also avoids the problems of weak adhesion of glue and surface in the conventional stacked materials, poor heat dissipation capability, weak support force, bursting and the like.

In this embodiment, material of the lower polarizer 4 or the upper polarizer 7 includes a guest-host type polymer liquid crystal. The material of the lower polarizer 4 or the upper polarizer 7 further includes a dichroic dye, that is, the dichroic dye is added to the guest-host type polymer liquid crystal. The material of the lower polarizer 4 or the upper polarizer 7 has flexibility because the lower polarizer 4 or the upper polarizer 7 is prepared by coating. The invention not only solves the technical difficulty of bonding the irregular shape polarizer but also solves the technical problem of breakage and failure when the polarizer is folded, consequently realizes the smaller curvature radius at the folded position of the display panel.

A thickness of the lower polarizer 4 or the upper polarizer 7 prepared by the coating method in this embodiment is much smaller than a thickness of the conventional thinnest polarizer. Moreover, the coating type polarizer design not only solves the difficulty of bonding the polarizer of irregular shape but also solves the technical problem that the polarizer breaks and fails during folding, consequently, the radius of curvature at the folded position of the display panel 100 to be smaller is achieved.

Figure 3:
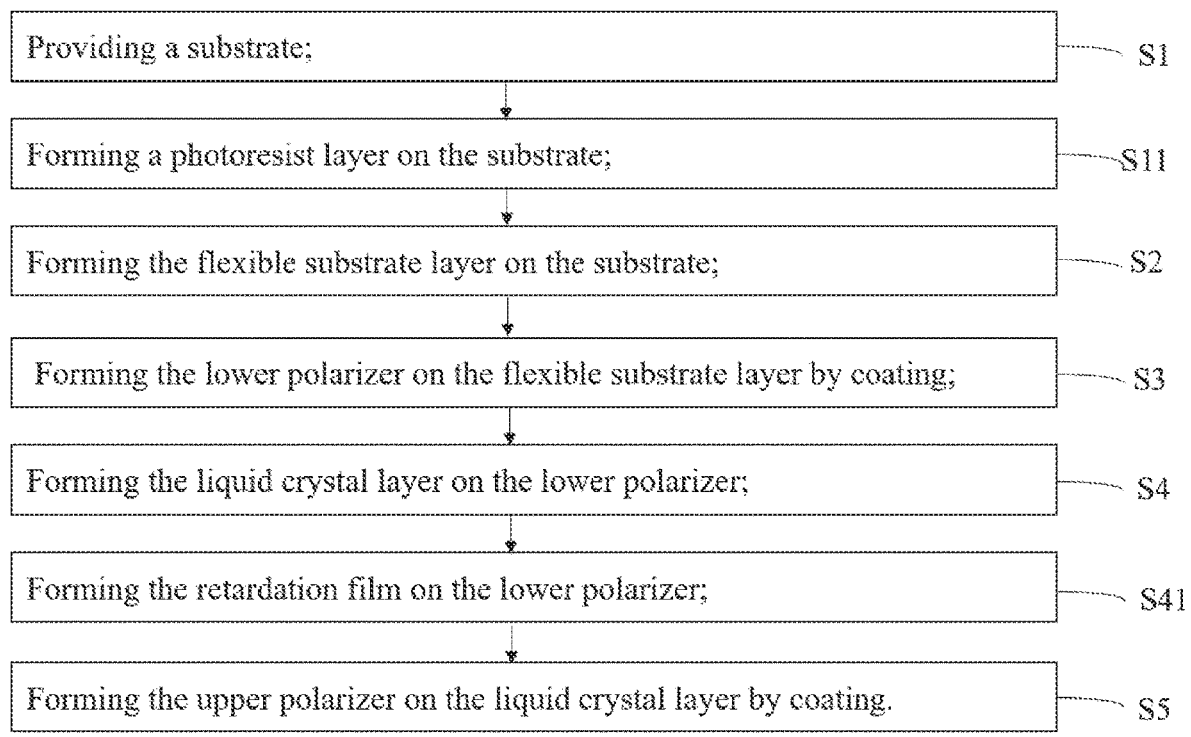
FIG. 3 is a flowchart of a method for manufacturing a display panel according to an embodiment of the present invention.

Please refer to FIG. 3, a method for manufacturing the display panel 100 is provided in one embodiment of the present invention, including the steps of:

S1, providing a substrate 1; material of the substrate 1 includes glass, polyethylene terephthalate or amorphous cycloolefin polymer;

S2, forming the flexible substrate layer 3 on the substrate 1;

S3, forming the lower polarizer 4 on the flexible substrate layer 3 by coating a guest-host polymer liquid crystal or a guest-host polymer liquid crystal added with a dichroic dye;

S4, forming the liquid crystal layer 6 on the lower polarizer 4; and

S5, forming the upper polarizer 7 on the liquid crystal layer 6 by coating a guest-host polymer liquid crystal or a guest-host polymer liquid crystal added with a dichroic dye.

In this embodiment, material of the lower polarizer 4 or the upper polarizer 7 includes a guest-host type polymer liquid crystal. The material of the lower polarizer 4 or the upper polarizer 7 further includes a dichroic dye, that is, the dichroic dye is added to the guest-host type polymer liquid crystal.

In this embodiment, after the step S1 of providing the substrate 1 and before the step S2 of forming the flexible substrate layer, the method further includes:

S11, forming a photoresist layer 2 on the substrate 1, the photoresist layer 2 encircles an edge of the substrate 1 to form a groove 10. The material of the photoresist layer 2 includes black ink or white ink. In other words, the color of the photoresist layer is black or white. The flexible substrate layer 3, the lower polarizer 4, the liquid crystal layer 6, and the upper polarizer 7 are sequentially formed in the groove 10.

In this embodiment, after the step S4 of forming the lower polarizer 4 and before the step S5 of forming the liquid crystal layer 6, the method further includes:

S41, forming the retardation film 5 on the lower polarizer 4. Specifically, the retardation film 5 is formed by coating and irradiating with ultraviolet rays. The main purpose of the retardation film 5 is to improve stability and service life of the polarizer. The compensation of the retardation film 5 is determined by the effect of ultraviolet irradiation, and the retardation film 5 compensates for the phase difference at different wavelengths of the liquid crystal layer 6, thereby improving the contrast. In addition, the retardation film 5 is provided to avoid the muster watermark phenomenon in the reliability test. Moreover, because it is a coating type material, also avoids the problems of weak adhesion of glue and surface in the conventional stacked materials, poor heat dissipation capability, weak support force, bursting and the like.

In this embodiment, in the step of forming the flexible substrate layer 3, the flexible substrate layer 3 is formed by a way of applying polyimide solution and performing alignment by irradiating with ultraviolet rays. The flexible substrate layer 3 has a thickness ranging from 400-800 Å.

A thickness of the lower polarizer 4 or the upper polarizer 7 formed by the coating method in this embodiment is much smaller than a thickness of the conventional thinnest polarizer. In addition, the coating type polarizer design not only solves the process difficulty of the irregular shape of the polarizer but also solves the technical problem of the breakage and failure of the polarizer when folded, and the display panel 100 having a smaller radius of curvature at the folded position is achieved.

The description of the above exemplary embodiments is only for the purpose of understanding the invention. It is to be understood that the present invention is not limited to the disclosed exemplary embodiments. It is obvious to those skilled in the art that the above exemplary embodiments may be modified without departing from the scope and spirit of the present invention.

What is claimed is:

1. A method of manufacturing a display panel, comprising steps of:
   providing a substrate;
   forming a flexible substrate layer on the substrate;
   forming a lower polarizer on the flexible substrate layer by coating;
   forming a liquid crystal layer on the lower polarizer; and
   forming an upper polarizer on the liquid crystal layer by coating;
   wherein after providing the substrate and before forming the flexible substrate layer, the method further comprises:
   forming a photoresist layer on the substrate, wherein the photoresist layer encircles an edge of the substrate to form a groove; and
   wherein the flexible substrate layer, the lower polarizer, the liquid crystal layer, and the upper polarizer are sequentially formed in the groove.

2. The method according to claim 1, wherein material of the lower polarizer or the upper polarizer comprises a guest-host type polymer liquid crystal.

3. The method according to claim 2, wherein material of the lower polarizer or the upper polarizer further comprises a dichroic dye.

4. The method according to claim 1, wherein material of the substrate comprises a glass, polyethylene terephthalate, or an amorphous cycloolefin polymer.

5. The method according to claim 1, wherein material of the photoresist layer comprises a black ink or white ink.

6. The method according to claim 1, wherein after forming the lower polarizer and before forming the liquid crystal layer, the method further comprises forming a retardation film on the lower polarizer.

7. The method according to claim 6, wherein in the step of forming the retardation film on the lower polarizer, the retardation film is formed by coating and irradiating with ultraviolet rays.

8. The method according to claim 1, wherein in a step of forming the flexible substrate layer, the flexible substrate layer is formed by a way of applying polyimide solution and performing alignment by irradiating with ultraviolet rays.

9. A display panel manufactured by the method according to claim 1, comprising:
   the substrate;
   the photoresist layer disposed around the edge of the substrate to form the groove;
   the flexible substrate layer disposed in the groove on the substrate;
   the lower polarizer disposed on the flexible substrate layer;
   a retardation film disposed on the lower polarizer;
   the liquid crystal layer disposed on the retardation film; and
   the upper polarizer disposed on the liquid crystal layer.

* * * * *